(No Model.)
J. E. ATWOOD.
BELT SHIPPER.
No. 247,794. Patented Oct. 4, 1881.
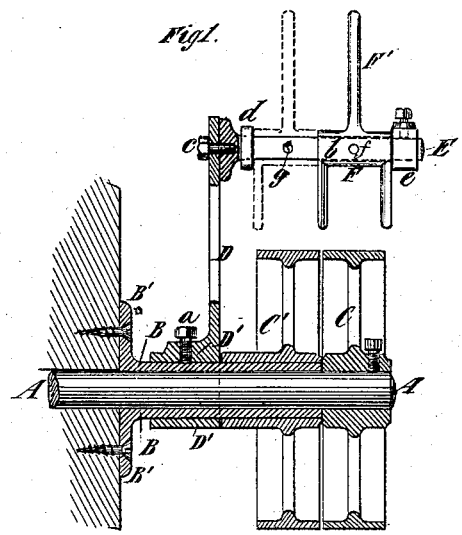
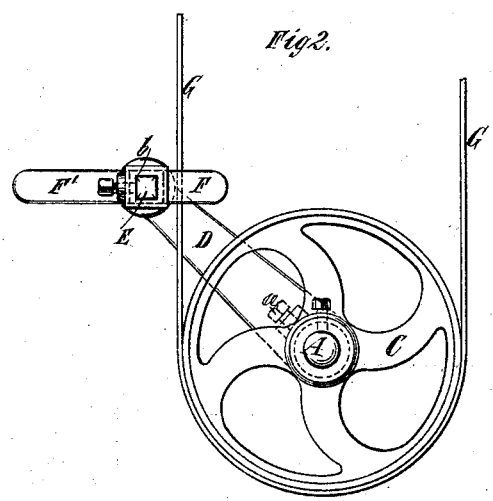
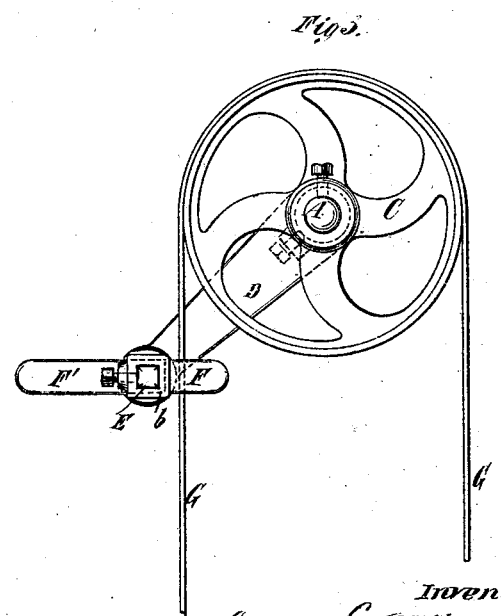
Witnesses
Inventor
John E. Atwood
by his Attorneys
Brown & Brown

United States Patent Office.

JOHN E. ATWOOD, OF STONINGTON, CONNECTICUT.

BELT-SHIPPER.

SPECIFICATION forming part of Letters Patent No. 247,794, dated October 4, 1881.

Application filed March 24, 1881. (No model.)

*To all whom it may concern:*

Be it known that I, JOHN E. ATWOOD, of Stonington, in the county of New London and State of Connecticut, have invented certain new and useful Improvements in Belt-Shippers, of which the following is a specification.

The principal object of my invention is to provide a belt-shipper which may be supported upon the same journal or bearing as the pulley or pulleys in connection with which it is used, and which may be conveniently adjusted to receive and ship a belt leading from any direction onto said pulley or pulleys.

The invention consists in the combination of a supporting-arm provided at one end with an eye or hub, whereby it may be supported concentrically upon an externally-cylindric shaft-bearing and adjusted circumferentially around the same, and secured in different positions, a shipper rod or bar attached to and projecting from said arm, and a shipper movable longitudinally upon said rod or bar. When the hub or eye of the said supporting-arm is fitted upon an externally-cylindric bearing concentrically with a shaft, it may be adjusted so as to project radially therefrom in any direction, and thus provide for adjusting the shipper to take a belt leading from any direction to pulleys upon the said shaft. The rod or bar upon which the shipper is movable is preferably secured to the supporting-arm, so that it may be turned axially, and secured in different positions, so that the shipper may be adjusted to cause its prongs to stand at approximately a right angle to the belt.

The invention also consists in the combination, with a shaft and externally-cylindric bearing, of a pulley fast upon the shaft, a supporting-arm for a belt-shipper secured upon said cylindric bearing, and a loose pulley fitted upon said bearing and held against longitudinal movement by said fast pulley and said supporting-arm.

In the accompanying drawings, Figure 1 represents a longitudinal section of a bearing, fast and loose pulleys, and shipper mechanism embodying my invention. Fig. 2 represents a face view thereof and an edge view of a belt driving onto said pulleys; and Fig. 3 represents a view similar to Fig. 2, except that the belt is represented as coming from a different direction and the shipper is adjusted to correspond.

Similar letters of reference designate corresponding parts in all the figures.

A represents a portion of a shaft, and B represents an externally-cylindrical bearing therefor, which may be made of a separate piece and attached to the frame of a machine by means of a flange, B′, or otherwise.

C designates a pulley, which is made fast to the shaft A, and C′ designates a loose pulley, here shown as fitted to the exterior of the bearing B, which is turned off to receive it.

D designates an arm extending radially from the shaft A, and having at one end an eye or hub, D′, which is concentric with the shaft, and, as here shown, is fitted upon the bearing B. The arm D may be adjusted circumferentially round the shaft A, and by means of a set-screw, $a$, or other device, it may be secured fast upon the bearing in any position to which it may be adjusted.

It will be observed that the hub of the loose pulley C′ fills the space between the hub of the fast pulley C and the hub or eye D′ of the arm D, and is thereby held against longitudinal movement in a very simple manner.

To the outer end of the supporting-arm D is attached a shipper rod or bar, E, which projects therefrom in a direction parallel with the shaft A, and upon the shipper rod or bar E is fitted a belt-shipper, F, movable longitudinally upon said rod or bar, and forked to receive a belt, G. The rod or bar E is represented as square, and the shipper F as having a square eye, $b$, which prevents it from turning on said rod or bar, while leaving it free to be moved thereon longitudinally. The shipper rod or bar E is preferably attached to the supporting-arm D, so that it may be turned axially to cause the shipper F to project in any direction, and this is accomplished, in the present instance, by attaching the rod or bar to the arm by a bolt, $c$, inserted through the arm and screwed into the end of the rod or bar.

By loosening said bolt the rod or bar may be easily turned, and by tightening the bolt readily secured in any position to which it may be adjusted.

Upon the shipper rod or bar E are two collars, $d\ e$, the former of which is loosely slipped on the rod or bar, and serves to limit the movement of the shipper F toward the arm D, and the latter of which may be secured by a set-screw in any position, to limit the movement of the shipper away from the said arm.

In the shipper F is a hole, $f$, and in the rod or bar E are corresponding holes $g$, through which a pin may be inserted when it is desired to lock the shipper fast. The shipper F has a projecting hand-piece, F', which may be taken hold of by a workman to shift the shipper when it is accessible to him; but when used as an overhead shipper, or in any locality where the hand-piece F' is not readily accessible, a wood handle may be bolted thereto.

In Figs. 1 and 2 the arm D and shipper rod or bar E are adjusted to act upon a belt running over an overhead pulley onto the pulleys C C'; but in Fig. 3 I have represented said parts as adjusted for a belt running upward from below.

It will be seen that by my invention I afford facility for quickly and easily adjusting the shipper to receive a belt arranged in any position.

What I claim as my invention, and desire to secure by Letters Patent, is—

1. In a belt-shipper, the combination of a supporting-arm provided at one end with a hub or eye, whereby it may it be supported upon an externally-cylindric bearing and adjusted circumferentially around the same, a shipper rod or bar projecting from said arm, and a shipper movable longitudinally upon said rod or bar, substantially as specified.

2. In a belt-shipper, the combination of a supporting-arm, a shipper rod or bar projecting from said supporting-arm and adapted to be turned axially and secured in different positions, and a shipper movable upon said rod or bar, substantially as specified.

3. The combination of the shaft A, the pulley C, fast thereon, the bearing B, the supporting-arm D, secured upon said bearing, the shipper rod or bar E, the shipper F, and the loose pulley C', fitting between the fast pulley C and the arm D, substantially as specified.

JOHN E. ATWOOD.

Witnesses:
C. H. CONART,
W. A. GILBERT.